Oct. 26, 1948.  G. W. LUCAS  2,452,478
DIAMOND TOOL AND METHOD FOR MAKING THE SAME
Filed May 10, 1944

Inventor:
George W. Lucas,
by Harry E. Dunham
His Attorney.

Patented Oct. 26, 1948

2,452,478

UNITED STATES PATENT OFFICE 2,452,478

DIAMOND TOOL AND METHOD FOR MAKING THE SAME

George W. Lucas, St. Clair Shores, Mich., assignor to Carboloy Company, Inc., a corporation of New York Application May 10, 1944, Serial No. 534,920

4 Claims. (Cl. 125—39)

The present invention is a diamond tool and more particularly a diamond truing tool for use in dressing grinding wheels and a method for making the same.

It is one of the objects of the present invention to provide a diamond tool in which injury to the diamonds during setting is avoided; a further object is to provide a setting in which the diamonds are held rigidly in position; a further object is to obtain a uniform distribution of the diamonds in the tool, another is to provide a diamond tool in which rigid control of the quality of the diamond tool is obtained; a further object is to provide a diamond tool adapted for mass production.

Figure 1:
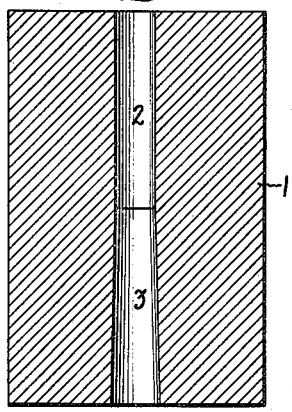
Figure 5:
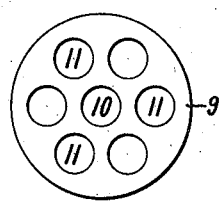
Figure 9:
Figure 10:
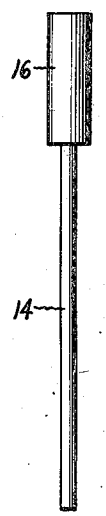
Figure 3:
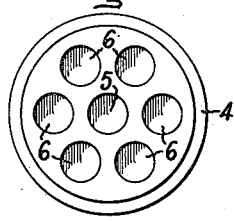
Figure 6:
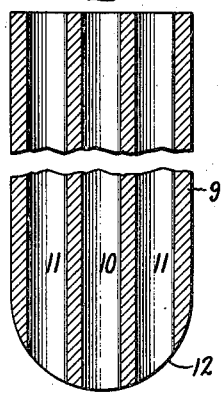
Figure 2:
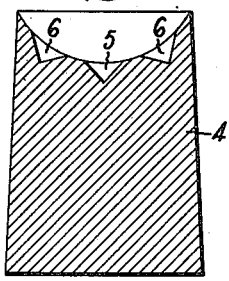
Figure 7:
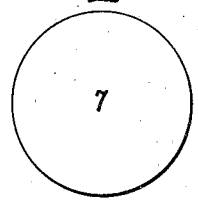
Figure 11:
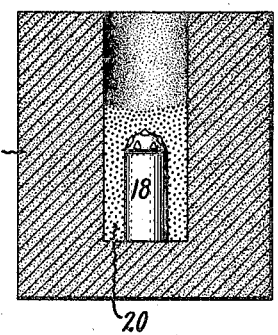
Figure 8:
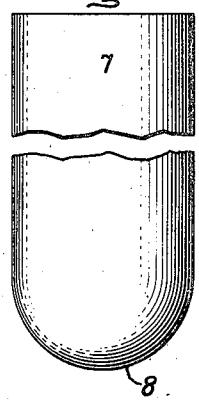
Figure 4:

The novel features which are characteristic of my invention are set forth with particularity in the appended claims. My invention itself however will best be understood from reference to the following specification when considered in connection with the accompanying drawing in which Fig. 1 is a vertical cross sectional view of a steel mold employed in carrying out my invention; Fig. 2 is a vertical cross sectional view, on an enlarged scale, of the bottom plunger employed in my process; Fig. 3 is a plan view of the bottom plunger illustrated in Fig. 2; Fig. 4 is a view in elevation of the top plunger employed in my process; Figs. 5 and 6 are respectively a plan view and a vertical sectional view, both on an enlarged scale, of the loading plunger; Figs. 7 and 8 are respectively a plan view and a vertical elevation, both on an enlarged scale, of a tapping rod which fits within the opening 2 in the steel mold; Figs. 9 and 10 are vertical, elevational views of press rods adapted respectively for use with the central opening and the radially positioned openings in the loading plunger; while Fig. 11 is a cross sectional view of a graphite container with a pressed diamond tool in position to be sintered and impregnated.

Referring more particularly to the drawing, I have indicated at 1 a steel mold having a round opening extending therethrough, the upper half 2 of the opening comprising a straight cylindrical opening, while the lower half 3 is slightly tapered. A steel bottom plunger 4 having a tapered surface is adapted to fit snugly in the conical or tapered opening 3 in the steel mold 1. The top or upper concave surface of the plunger 4 has a plurality of conical shaped cavities thereon comprising a central cavity 5 and a series of cavities 6 which are spaced circumferentially and substantially equal distances apart, the centers of all cavities 6 being located on a circle the center of which is in a line constituting an extension of the axis of the bottom plunger 4. When seven cavities are employed an angle of about 60° is formed by two straight lines passing respectively through the centers of adjacent cavities 6 and intersecting at the center of the central cavity 5.

In carrying out my improved process, a diamond, which may be a whole diamond or a chip, is positioned in each of the openings 5 and 6 on plunger 4 and covered with hard metal powder which preferably consists of any one or more hard metal carbides, for example tungsten carbide, molybdenum carbide, titanium carbide, tantalum carbide, such as generally employed in the manufacture of cemented carbide compositions. If desired, a small quantity of copper and cobalt may be added to the carbide, for example one-quarter of a per cent of each element. While the addition of such elements is not essential, they impart toughness to the pressed diamond impregnated article and permit it to be handled safely prior to the sintering operation.

The powdered carbide may be pressed over the diamonds in the openings 5 and 6 by hand after which the plunger 4 is inserted in the tapered opening 3 of the mold 1. A tapping rod 7 having a dome shaped lower end 8 then is inserted in the opening 2 of the mold 1 and pressed into the powdered material thereby forming an upper surface thereon similar to and having substantially the same concavity as the upper surface of the plunger 4. Tapping rod 7 is now withdrawn and a loading plunger 9 inserted in its place in the opening 2 of the steel mold. The loading plunger is provided with a central longitudinal or axial opening 10 and six parallel openings 11 which are spaced apart substantially identically with the cavities 5 and 6 on the bottom plunger 4. The loading plunger 9 has a dome shaped lower end 12 substantially identical in shape and extent with the dome shaped end portion 8 of the tapping rod 7. After the loading plunger 9 has been positioned in the opening 2 in the mold 1 a diamond is deposited in each of the openings 10 and 11 and pressed into the carbide powder by press rods 13 and 14 the reduced ends of which are inserted and fit respectively in the openings 10 and 11 of the loading plunger 9. Press rods 13 and 14 have enlarged upper end portions 15 and 16 respectively which are adapted to contact with the upper surface of the loading plunger 9 and limit the movement of the press rod therein. The reduced portion of press rod 13 has the same length as the central opening 10 in the loading plunger 9 while the reduced portion of the press rod 14 has the same length as openings 11.

After the individual diamonds have been pressed into the carbide powder by the rods 13 and 14 the loading plunger 9 is withdrawn from the mold 1 and a layer of carbide powder deposited on the spaced diamonds and shaped with the tapping rod 7 to provide it with a dome shaped cavity substantially identical in every way with the end portion 8 of the tapping rod 7. The tapping rod is now withdrawn and the loading plunger 9 again inserted in the opening 2 of the mold and a diamond placed in each of the openings in the loading plunger and pressed into position in the carbide powder by the press rods 13 and 14, after which the loading plunger 9 is withdrawn and the diamonds again covered with carbide powder which is again provided with the desired dome shaped surface.

In the manufacture of truing tools I generally employ above five domed shaped layers of diamonds embedded in carbide powder, the diamonds in each layer being spaced apart exactly the same distance and the successive layers being so positioned that as the diamonds in one layer wear out the next succeeding series or layer is in an operative position. Each layer has substantially the identical contour and spacing of diamonds as the first or bottom layer.

When the desired number of layers of carbide powder and diamonds have been formed additional powdered carbide is added to form the bottom or shank portion of this tool and provide the desired length of tool. Pressure is then applied to this additional carbide powder by the top plunger 17 to form a flat base on the tool. The compressed tool now may be removed from mold 1 and plunger 4 and heated in any convenient manner to a temperature of about 650° C.

The presintered tool which has the appearance and size of the tool 18 illustrated in Fig. 11 is rigid enough to be handled without breakage and is now inserted in a graphite receptacle 19, the diamond end of the tool being uppermost in the mold. The tool fits loosely within the mold and is surrounded by copper or a cupreous alloy 20 which may be in the form of powder or filings, or sheet metal. The graphite receptacle and material therein are now heated at a temperature of about 1150 to 1200° C. to further sinter the carbide matrix, melt the copper, and cause it to impregnate the pores in the carbide matrix.

In my improved truing tool the diamonds in each layer are spaced apart substantially equally in a predetermined manner and each dome shaped arrangement of diamond is substantially identical in shape and cutting ability with the others. It is possible therefore to provide tools of uniform quality. The cupreous impregnating metal assists in providing a strong matrix in which the diamonds are rigidly held in position. A further advantage of the present process is its adaptability to mass production methods since the various operations obviously are adapted to be carried out in successive steps.

What I claim as new and desire to secure by Letters Patent of the United States, is:

1. A diamond tool comprising a plurality of similar layers, each of said layers consisting of spaced diamonds embedded in a sintered hard metal carbide matrix impregnated with a cupreous metal, the number of diamonds in each layer being substantially equal and spaced apart substantially equal distances.

2. A diamond tool comprising a plurality of similar and substantially parallel dome shaped layers, each of said layers consisting of diamonds embedded in a sintered matrix, said matric consisting of one or more hard metal carbides impregnated with a cupreous metal.

3. A diamond tool comprising a plurality of similar, substantially parallel dome shaped layers, each of said layers consisting of diamonds embedded in a sintered matrix consisting of one or more carbides from the group tungsten carbide, molybdenum carbide, tantalum carbide and titanium carbide impregnated with copper.

4. The method of making a diamond tool which comprises positioning diamonds in cavities on a concave surface covering the upper portion of said diamonds with a powdered matrix, forming a dome shaped surface on said powdered matrix substantially parallel to said concave surface, partially embedding a series of diamonds in said surface, covering said diamonds with a powdered matrix, pressing a concave surface on said matrix and adding diamonds and powdered material as before to provide a desired series of substantially parallel dome shaped layers each consisting of spaced diamonds and a powdered matrix therefor and thereafter sintering said matrix and impregnating it with a cupreous metal.

GEORGE W. LUCAS.

REFERENCES CITED

The following references are of record in the file of this patent:

UNITED STATES PATENTS

| Number | Name | Date |
|---|---|---|
| Re. 22,373 | Benner et al. | Sept. 14, 1943 |
| 1,587,805 | Taylor | June 8, 1926 |
| 1,904,568 | Taylor | Apr. 18, 1933 |
| 1,996,598 | Taylor | Apr. 2, 1935 |
| 2,068,848 | De Bats | Jan. 25, 1937 |
| 2,141,202 | Wallace | Dec. 27, 1938 |
| 2,170,164 | Stone et al. | Aug. 22, 1939 |
| 2,182,562 | Koebel | Dec. 5, 1939 |
| 2,200,281 | Koebel | May 14, 1940 |
| 2,228,871 | De Bats | Jan. 14, 1941 |
| 2,339,270 | Kelleher | Jan. 18, 1944 |
| 2,349,825 | Kelleher | May 30, 1944 |
| 2,358,459 | Kelleher | Sept. 19, 1944 |

FOREIGN PATENTS

| Number | Country | Date |
|---|---|---|
| 16,881 | Great Britain | July 16, 1897 |
| 543,633 | Great Britain | Mar. 5, 1942 |
| 101,940 | Sweden | Apr. 30, 1941 |
| 110,118 | Australia | Mar. 13, 1940 |